US008430142B2

(12) United States Patent
Incavo et al.

(10) Patent No.: US 8,430,142 B2
(45) Date of Patent: Apr. 30, 2013

(54) ENVIRONMENTALLY RESISTANT ASSEMBLY CONTAINING AN ELECTRONIC DEVICE FOR USE IN A TIRE

(75) Inventors: Joseph Alan Incavo, Hudson, OH (US); Warren James Busch, North Canton, OH (US); Gary Edwin Tubb, Copley, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 590 days.

(21) Appl. No.: 12/392,677

(22) Filed: Feb. 25, 2009

(65) Prior Publication Data
US 2010/0212791 A1    Aug. 26, 2010

(51) Int. Cl.
*B60C 19/08* (2006.01)

(52) U.S. Cl.
USPC ....................................... 152/152.1

(58) Field of Classification Search ............. 152/152.1
See application file for complete search history.

(56) References Cited

U.S. PATENT DOCUMENTS

| | | |
|---|---|---|
| 4,718,469 A | 1/1988 | Koch et al. |
| 5,483,827 A | 1/1996 | Kulka et al. |
| 5,562,787 A * | 10/1996 | Koch et al. ............. 156/64 |
| 6,244,104 B1 | 6/2001 | Koch et al. |
| 6,524,415 B1 | 2/2003 | Youngman et al. |
| 6,546,982 B1 * | 4/2003 | Brown et al. ............. 152/152.1 |
| 6,832,637 B2 | 12/2004 | Majumdar et al. |
| 6,885,291 B1 | 4/2005 | Pollack et al. |
| 6,978,669 B2 | 12/2005 | Lionetti et al. |
| 7,017,405 B2 | 3/2006 | Benedict et al. |
| 7,082,818 B2 | 8/2006 | Wilson |
| 7,102,499 B2 | 9/2006 | Myatt |
| 7,108,761 B2 | 9/2006 | Bell |
| 7,132,930 B2 | 11/2006 | Wilson et al. |

(Continued)

FOREIGN PATENT DOCUMENTS

| | | |
|---|---|---|
| DE | 102 55 138 A1 | 6/2004 |
| EP | 0689950 A2 | 1/1996 |

(Continued)

OTHER PUBLICATIONS

Chemlok 6254 Versitile One-Coat Adhesive Printed in 2003.*

(Continued)

*Primary Examiner* — Joseph Del Sole
*Assistant Examiner* — David N Brown, II
(74) *Attorney, Agent, or Firm* — Wood, Herron & Evans, LLP (57) ABSTRACT

An assembly for use in or on a tire. The assembly comprises an electronic device having a body and an adhesive coating on at least the body of the electronic device. The body is at least partially made of a plastic material or a fiber reinforced plastic (FRP). The adhesive coating comprises an imide-based adhesive. The adhesive coating may have a polymer bonding group comprising at least one of natural rubber, butyl rubber, a chlorinated elastomer, polybutadiene, synthetic polyisoprene, or styrene-butadiene rubber or a combination thereof. In one embodiment, the assembly further comprises a first elastomeric layer and a second elastomeric layer. The adhesive coating secures the body to the first and the second elastomeric layers. The first and second elastomeric layers may comprise a butyl-containing compound or natural rubber compound. In one embodiment, the electronic device is a radio frequency identification tag having the body and an antenna.

14 Claims, 6 Drawing Sheets

U.S. PATENT DOCUMENTS

| | | |
|---|---|---|
| 7,151,495 B2 | 12/2006 | Strache et al. |
| 7,186,308 B2 | 3/2007 | Metcalf et al. |
| 2004/0159383 A1 | 8/2004 | Adamson et al. |
| 2004/0182494 A1 | 9/2004 | Dominak et al. |
| 2004/0189456 A1 | 9/2004 | Myatt |
| 2004/0252072 A1 | 12/2004 | Adamson et al. |
| 2005/0076982 A1 | 4/2005 | Metcalf et al. |
| 2005/0076992 A1 | 4/2005 | Metcalf et al. |
| 2005/0087593 A1 | 4/2005 | Benedict |
| 2005/0099283 A1 | 5/2005 | Johnson et al. |
| 2005/0101060 A1 | 5/2005 | Tsunoda et al. |
| 2006/0123899 A1* | 6/2006 | Nakao et al. ............... 73/146 |
| 2006/0237109 A1 | 10/2006 | Mangold et al. |
| 2006/0254695 A1* | 11/2006 | Higuchi et al. ............ 156/133 |
| 2006/0290505 A1 | 12/2006 | Conwell et al. |
| 2007/0107824 A1 | 5/2007 | Hahn et al. |
| 2007/0146124 A1 | 6/2007 | Shinmura |
| 2007/0279202 A1 | 12/2007 | Lionetti |
| 2008/0083482 A1 | 4/2008 | Logan |

FOREIGN PATENT DOCUMENTS

| | | | |
|---|---|---|---|
| EP | 1 384 603 A1 | 1/2004 | |
| EP | 1 459 911 A1 | 3/2004 | |
| EP | 1 454 771 A1 | 9/2004 | |
| EP | 1 544 001 A1 | 6/2005 | |
| EP | 1 580 041 A1 | 9/2005 | |
| GB | 616530 A | 1/1949 | |
| JP | 2007230261 A | 9/2007 | |
| KR | 100822850 B1 | 4/2008 | |
| KR | 2008039715 A | 5/2008 | |
| KR | 2008046816 A | 5/2008 | |
| WO | 03 105509 A1 | 12/2003 | |
| WO | 03 105511 A1 | 12/2003 | |
| WO | 2004048132 A1 | 6/2004 | |
| WO | 2005035278 A2 | 4/2005 | |
| WO | 2007100111 A1 | 9/2007 | |
| WO | 2007127220 A2 | 11/2007 | |
| WO | 2007127358 A2 | 11/2007 | |

OTHER PUBLICATIONS

Lord Chemlok 6254 MSDS Nov. 15, 2005.*
Lord Corporation, Material Safety Data Sheet, CHEMLOK 6254, pp. 1-5, Nov. 15, 2005.
Lord Corporation, Material Safety Data Sheet, CHEMLOK 250, pp. 1-5, Apr. 29, 2008.
Lord Chemical Products, CHEMLOK 6254, pp. 1-2, Jan. 2003.
European Patent Office, European Search Report, from related European Application No. 10154238.9, dated May 26, 2010.
European Patent Office, Office Action from related European Application No. 10154238.9, dated Sep. 9, 2011, 5pp.
Chinese Patent Office, Office Action and Letter, from related Chinese Application No. 201010125858.2, issued Oct. 26, 2011 and mailed Nov. 24, 2011, 15pp.
Office Action issued in European Patent Application No. 10 154 238.9-2425; Jan. 16, 2013; 5 pages; European Patent Office.

* cited by examiner

ENVIRONMENTALLY RESISTANT ASSEMBLY CONTAINING AN ELECTRONIC DEVICE FOR USE IN A TIRE

FIELD OF THE INVENTION

The present invention generally concerns an assembly containing a radio frequency device for use on a tire, and, more particularly, concerns an assembly that exhibits improved environmental resistance to conditions found in tire applications.

BACKGROUND OF THE INVENTION

Pneumatic tires are conventionally of an open toroidal shape defining a cavity. Closure of the cavity is completed by mounting the tire on a rigid rim. The tire has a rubber innerliner which is an exposed interior surface of the tire cavity.

It is desirable to provide pneumatic tires with an electronic device which may allow information about the tire to be transmitted to an external device. The incorporation of electronic devices within the pneumatic tire yields many practical advantages. For example, the information may facilitate the tracking of the tire during its lifetime during both the manufacturing and use of the tire. In one particular application, electronic devices integrated in or on tire structures provide the ability to track the tire for commercial vehicular applications. Commercial vehicular applications may include commercial truck fleets, consumer tires, aviation crafts, and earthmover/mining vehicles. In these and other applications, electronic devices can enable casing traceability and simplify fleet management. This type of tracking information may aid in maintenance planning and in designing new tires for such commercial systems.

Electronic devices may include sensors and other components for obtaining information regarding various physical parameters of a tire, such as temperature, pressure, number of tire revolutions, vehicle speed, etc. One such electronic device is a radio frequency identification (RFID) device, sometimes referred to as RFID tags or transponders.

Most RFID tags contain at least two parts. One part is an integrated circuit for storing and processing information. The information stored and processed may include information that identifies the tire. The second part is an antenna for receiving and transmitting a signal to an external reader. The antenna may be a separate wire soldered or otherwise connected to the chip or may be printed or carried, along with the chip, on a substrate. As is known, the reader may also be capable of powering the RFID tag as well as receiving information transmitted from the RFID tag. Other components may include a host computer, a network, and an application program for evaluating or manipulating the information stored in the integrated circuit.

The electronic device is often packaged in other materials prior to securing it to the tire. Concerns associated with this package relate to durability of the package itself, the attachment of the package to the tire, and containment of the electronic device within the package. For example, under the adverse environmental conditions experienced by a tire during use, particularly the cyclic flexing of the tire sidewall, the package containing the electronic device may weaken with the end result being that the electronic device ceases to function.

Therefore, there is a need for effective packaging that can withstand environmental conditions experienced by the tire over the tire's useable lifetime while remaining secured to the tire.

SUMMARY OF THE INVENTION

In one embodiment of the invention, an assembly is provided for use in or on a tire. The assembly comprises an electronic device having a body. The body is at least partially made of a plastic material or a fiber reinforced plastic (FRP). An adhesive coating coats at least the body of the electronic device. The adhesive coating comprises an imide-based adhesive. The assembly may further comprise a first elastomeric layer and a second elastomeric layer. The electronic device may reside between the first elastomeric layer and the second elastomeric layer. The adhesive coating secures the body to the tire or to the first and the second elastomeric layers. Further, the electronic device may comprise the body and an antenna.

In another embodiment, the adhesive coating has a polymer bonding group comprising at least one of natural rubber, a chlorinated elastomer, butyl rubber, styrene-butadiene rubber, polybutadiene, or synthetic polyisoprene, or a combination thereof.

Further, in another embodiment of the invention, the adhesive comprises a zinc-containing compound or a selenium-containing compound or a combination thereof.

In yet another embodiment of the invention, the first and second elastomeric layers comprise a butyl-containing compound or natural rubber compound.

In another embodiment of the invention, a tire comprises a tire wall and an assembly affixed to the tire wall. The assembly comprises a first elastomeric layer, a second elastomeric layer, an RFID tag between the first elastomeric layer and the second elastomeric layer, and an imide-based adhesive. The first and the second elastomeric layers are selected from a group consisting of a butyl-containing compound and a natural rubber compound. The RFID tag has a body and an antenna with the body being at least partially made of a plastic material. The imide-based adhesive coating is on at least the body of the RFID tag and secures the body to the first and second elastomeric layers. The imide-based adhesive coating comprises at least one of a zinc-containing compound or a selenium-containing compound or combinations thereof and a polymer bonding group comprising at least one of natural rubber, a chlorinated elastomer, butyl rubber, styrene-butadiene rubber, polybutadiene, or synthetic polyisoprene or a combination thereof.

BRIEF DESCRIPTION OF THE DRAWINGS

The invention will be described by way of example and with reference to the accompanying drawings in which.

DETAILED DESCRIPTION

Figure 1:
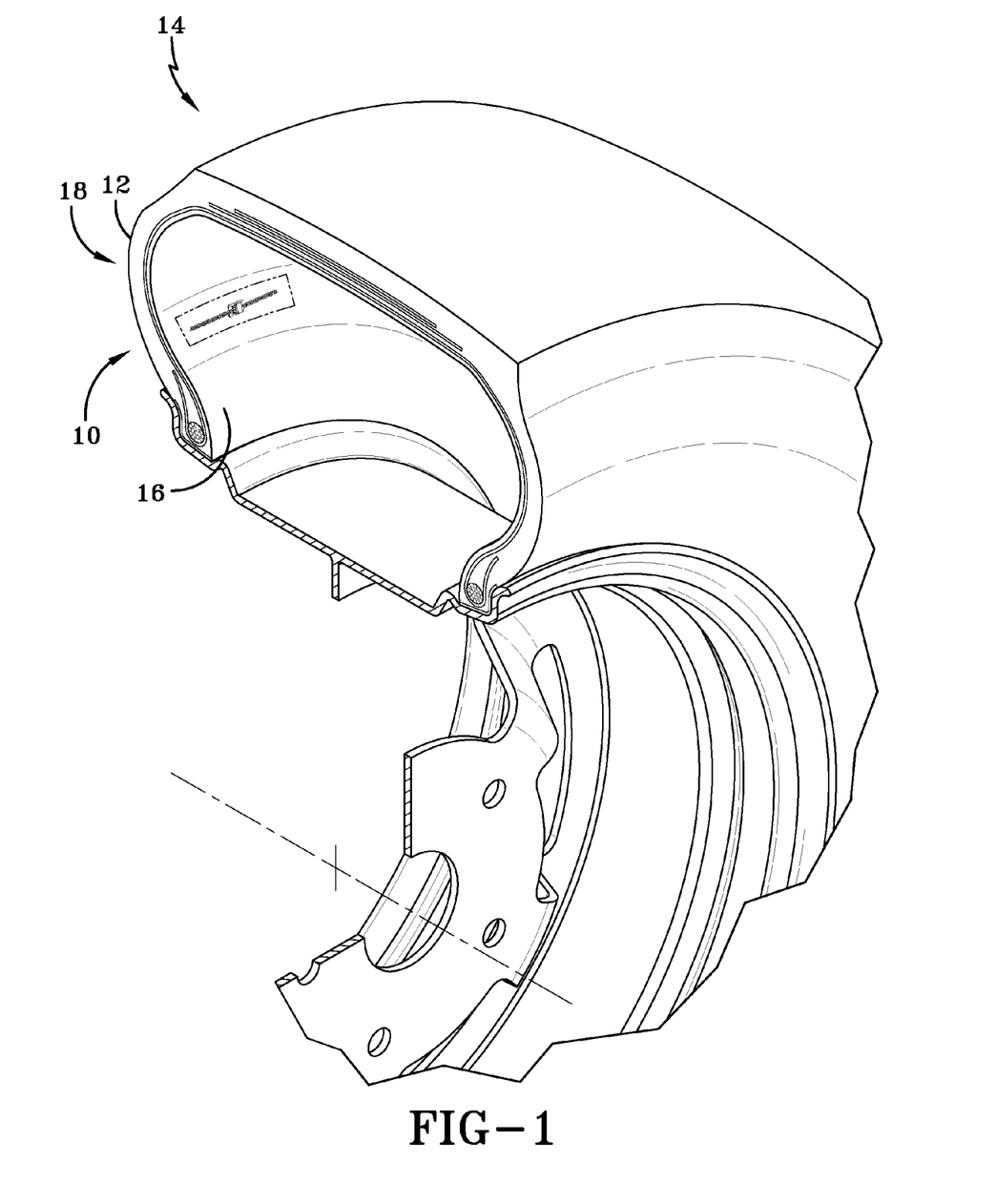
FIG. 1 is a cross-sectioned isometric view of an exemplary tire with an assembly secured thereto according to an embodiment of the invention.

As shown in FIG. 1, an assembly 10 of the present invention is fixed on a wall 12 of tire 14. It will be understood that the assembly 10 may be affixed to the surface of an innerliner 16 (as shown) of the tire 14 or internal to the casing 18 depending upon the composition of the assembly 10 as set out below.

Figure 2:
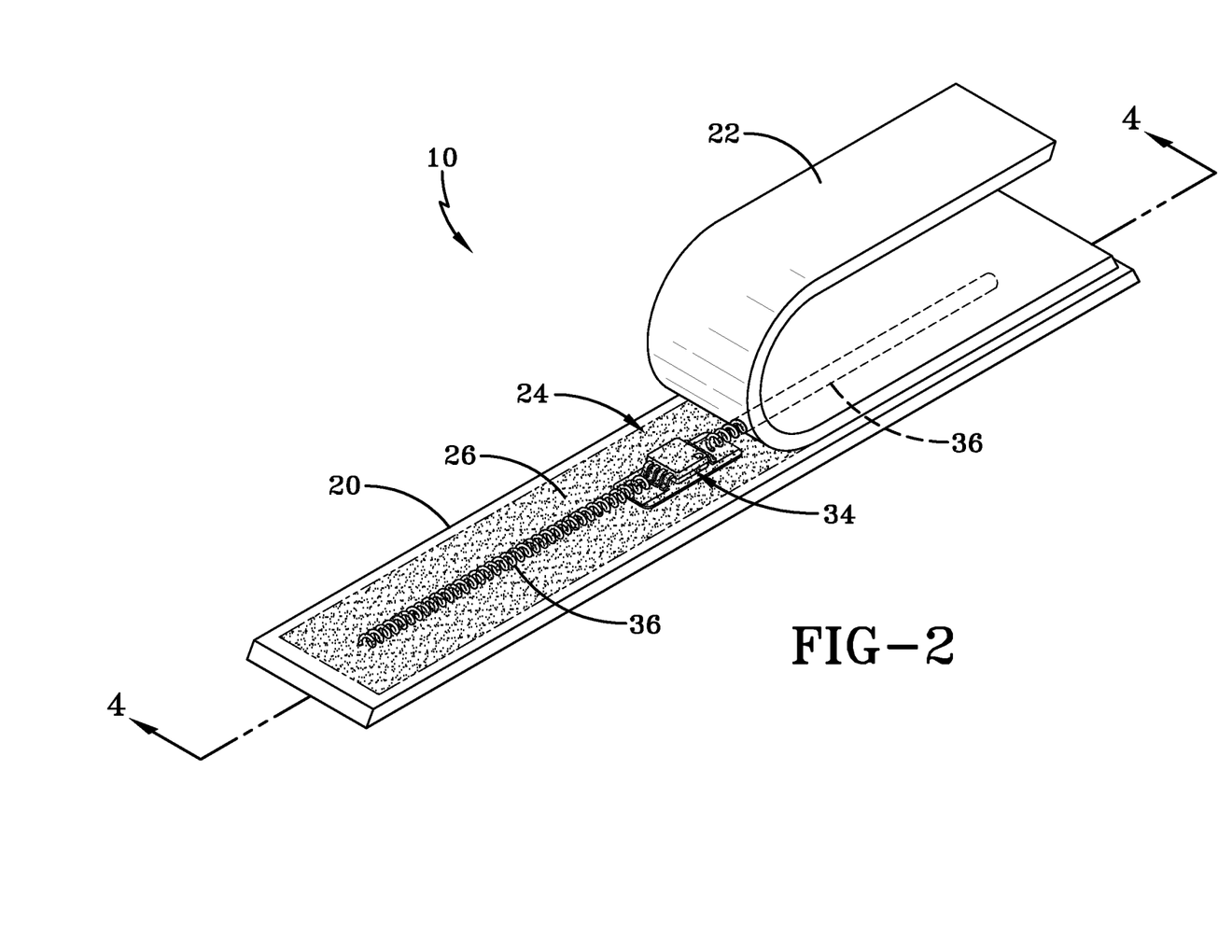
FIG. 2 is an isometric view of an assembly according to one embodiment of the present invention with one layer partially pulled back to illustrate an electronic device therebetween.
Figure 3:
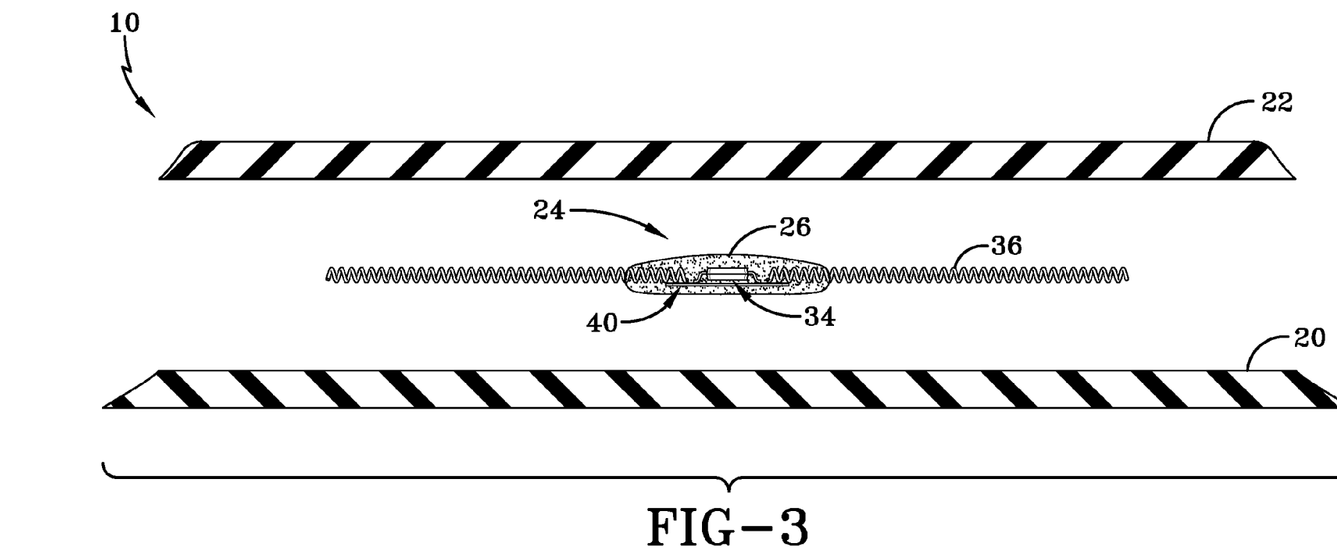
FIG. 3 is an exploded elevation view of the assembly of FIG. 2 illustrating an electronic device at least partially coated with an adhesive and secured between two layers of elastomeric material according to one embodiment of the invention.
Figure 3A:
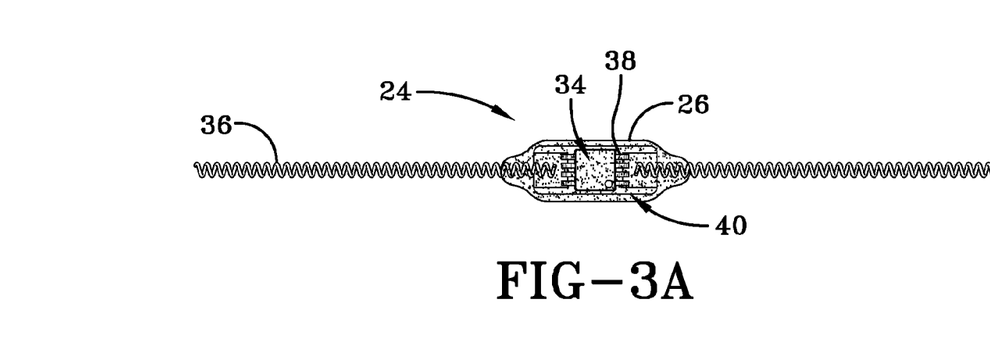
FIG. 3A is a plan view of an electronic device shown in FIGS. 2 and 3.

Referring now to FIGS. 2 and 3, the assembly 10 comprises at least two elastomeric layers, a first elastomeric layer 20 and a second elastomeric layer 22. An electronic device 24 resides between the first elastomeric layer 20 and the second elastomeric layer 22 and is secured there between with an adhesive coating 26. The first and second elastomeric layers 20, 22 are, however, optional. For example, the electronic device 24 that is coated with the adhesive coating 26, as shown in FIG. 3A and described below, may be positioned between two layers of the tire during the tire build process, such as between the casing plies in a tire wall.

With reference once again to FIGS. 2 and 3, the second elastomeric layer 22 may have a smaller area than the first elastomeric layer 20. In other words, the perimeter of the second elastomeric layer 22 may lie within the first elastomeric layer 20. By way of example, the first elastomeric layer 20 may measure from about 4.5 inches in length by about 0.8 inches in width by about 0.050 inches in thickness and the second elastomeric layer 22 may measure about 0.125 inches smaller in length and width such that the perimeter of the second elastomeric layer 22 resides within the perimeter of the first elastomeric layer 20. However, other dimensions may be utilized depending on the application.

With reference to FIGS. 1-6, the electronic device 24 is represented generically. One skilled will appreciate that the electronic device 24 may be any electronic device that is intended to function at an embedded location with another article, such as the tire 14. The electronic device 24 includes a body 34 that is at least partially made of a plastic material or polymer. Consequently, the body 34 is typically rigid in its construction. By way of example, the electronic device 24 may be a sensor for detecting one or more of pressure, temperature, strain, or conductivity in the article, to name only a few. In one particular application the electronic device 24 is an RFID (Radio-frequency Identification) tag or transponder, as is shown best in FIG. 3A. The RFID tag comprises the body 34 and an antenna 36 in electrical communication with the body 34, as shown. Further, the body 34 may include an integrated circuit 38 and/or a printed circuit board 40. The antenna 36 may comprise a separate wire that is soldered or electronically connected to the body 34. Alternatively, the antenna 36 may be printed or integrated onto a polystrip, i.e, a flexible strong polymer film, or the printed circuit board 40.

The integrated circuit 38 modulates and demodulates a radio frequency signal transmitted by an external reader (not shown). The printed circuit board 40 may be made of conductive and insulating layers (not shown). Generally, the insulating layers can be a plastic material or other polymer, for example, polytetrafluoroethylene and/or various epoxies. The insulating layers may also include other materials, such as glass or other fibers. In that respect, the insulating layers of the printed circuit board 40 may be referred to as fiber reinforced plastic (FRP). In another embodiment, the body 34 may form an enclosure (not shown) or the body 34 and the antenna 36 and be enclosed within FRP such that only the FRP shell is in contact with the adhesive coating 26.

Additionally, the electronic device 24 may incorporate multiple electronic devices or sensors that are electrically connected to one another. In this case, the RFID tag may be used to identify the tire 14, may provide other information about that tire, and/or the condition of the tire 14 depending upon what type of, if any, additional electronic sensors are electronically connected thereto. In one exemplary embodiment, the RFID tag responds to or operates in the range of from about 130 MHz to higher frequencies, and, in another example, the tag operates in the Ultra High Frequency (UHF) range from 300 MHz to higher frequencies, such as from about 860 MHz to about 960 MHz. While reference is made to an RFID tag, it will be appreciated that other types of electronic devices may be utilized in conjunction with or as an alternative to the RFID tag.

With continued reference to FIGS. 1, 2, and 3, in an alternative embodiment, the first and the second elastomeric layers 20, 22 comprise a rubber. It will be appreciated that other suitable rubbers may include natural rubber compounds, synthetic polyisoprene, butyl-based rubbers, styrene-butadiene rubber, polybutadiene rubber, and ethylene propylene diene M-class (EPDM) rubber to name only a few. An exemplary rubber composition contains 100 part per hundred rubber (phr) natural rubber compound from Agro Rubber sold as TSR20; 80 phr HAF Carbon Black (N-330) sold by Sid Richardson Carbon and Energy Co. as SR310; 8 phr napthenic oil sold by ExxonMobil as Naprex 38; 1 phr stearic acid sold by Chemtura, Hong Kong, China, as Industrene R; 3 phr resorcinol sold by Indspec Chemical Corp. as resorcinol; 3 phr hexamethylenetetramine sold by Chemico as Hexa; 3 phr zinc oxide sold by US Zinc, Millington, Tenn., as NAO115; 1.5 phr N-tert-butyl-2-benzothiazolesulfenamide sold by FLEXSYS®, Akron, Ohio, as Santocure TBBS; and 3 phr sulfur from SF Sulfur Corporation, Freeport, Tex. as Rubbermaker's sulfur. Embodiments of the invention where the first and second elastomeric layers 20, 22 comprise a natural rubber compound may find application internal to the tire casing 18. It will also be appreciated that the first and second elastomeric layers 20, 22 may comprise other suitable materials that are compatible with the materials found in the casing 18.

With reference now to FIGS. 2 and 3, in one embodiment, at least one of the first or the second elastomeric layers 20, 22 comprise a butyl-containing compound. By way of example only, the butyl-containing compound may be butyl rubber such as a halogenated butyl rubber (halobutyl), for example, chlorinated butyl rubber (chlorobutyl) or brominated butyl rubber (bromobutyl), or a non-halogenated butyl rubber. As is described more fully below, the butyl-containing elastomeric layer preferably forms the surface of the assembly 10 that is exposed to the atmosphere found within a tire. Both of the elastomeric layers 20, 22 may comprise butyl-containing compounds. By way of additional example, the butyl-containing elastomeric layer may comprise 100 phr ExxonMobil bromobutyl 2255; 50 phr GPF carbon black (N-660) sold under the trade name STERLING®V by Cabot Corporation Alpharetta, Ga.; 8 phr napthenic oil from ExxonMobil sold as Naprex 38; 2 phr stearic acid from Chemtura, Hong Kong, China, sold as Industrene R; 0.5 phr sulfur from SF Sulfur Corporation, Freeport, Tex., sold as Rubbermaker's Sulfur; and 1.5 phr benzothiazyl disulfide sold by Ke Mai Chemical Co. Ltd. Tianjin, China, as Accelerator DM. Advantageously, the butyl-containing compounds may promote better anchoring of the assembly 10 to an innerliner and may improve bonding with the antenna 36 because it may flow more freely and may wet the metal wire to a greater degree than other commonly used elastomeric materials in the tire industry.

In addition, the butyl-containing compound advantageously resists oxidation over prolonged periods of exposure to the interior of the tire. The butyl-containing compound therefore resists hardening due to reaction with oxygen; other gases, like moisture; or environmental conditions commonly found within the tire. As is known in the art, the environment found within a pneumatic tire can attack various materials, which is usually followed by a weakening of the material. For example, exposed metals, like those used to make antennas, may corrode over time. In addition, some elastic materials lose their elasticity or embrittle when exposed to the same conditions. As the elastic material hardens, the bond between the elastic material and the tire is subject to increasingly greater stresses. The elastic material is therefore more likely to debond, for example, from the innerliner of the tire as a result. When these materials are utilized to attach devices to tires, they often harden prematurely. However, the assembly 10 comprising butyl-containing compounds remains flexible enough such that it remains substantially secured to the innerliner of a tire for extended periods of use while the first and second elastomeric layers 20, 22 protect the electronic device 24 from environmental attack.

As set out above and depicted in FIGS. 3 and 3A, at least the body 34 of the electronic device 24 is coated with the adhesive coating 26. However, the adhesive coating 26 may coat all of the electronic device 24, which may include a portion of the antenna 36, as shown in FIG. 2, or all of the antenna 36. The function of the adhesive coating 26 may be at least two-fold. The adhesive coating 26 secures the body 34 to the first and the second elastomeric layers 20, 22, and may also secure the antenna 36 to the first and the second elastomeric layers 20, 22. The bonding between the body 34 and the adhesive coating 26 facilitates retention of the body 34 between the first and second elastomeric layers 20, 22. In particular, an adhesive that bonds to the body 34, particularly a body that comprises an FRP, provides improved retention of the electronic device 24 within the assembly 10. Adhesives that bond to the body 34, particularly to FRP materials, unexpectedly improve the durability of the assembly 10. Thus, the electronic device 24 is less likely to work its way free from between elastomeric layers 20, 22 and be destroyed or damaged as a consequence. Additionally, where the adhesive coating 26 coats the antenna 36, the adhesive coating 26 also provides a barrier to moisture and other gases that may corrode the antenna 36 specifically, or the electronic device 24 generally.

The adhesive coating 26 is based on an imide chemistry rather than isocyanate chemistry. In other words, the adhesive coating 26 comprises an imide-based adhesive. Imide-based or polyimide adhesives may be available from Lord Corporation, Cary, N.C., under the trademark CHEMLOK® 6254, though other suitable compounds may be commercially available from, for example, Henkel Corporation, Rocky Hill, Conn. Imide-based adhesives may also be substantially isocynanate-free and generally do not include, for example, aromatic polyisocyanate, 4,4'-diphenylmethane diisocyanate, or diphenylmethane diisocyanate. Polyimides include those derived from, for example, aliphatic diamines and aromatic anhydrides. Imide-based adhesives may include fillers, such as carbon black or other performance enhancing fillers, and solvents, such as toluene, xylene, and ethyl benzene. In addition, these adhesives are suited for higher temperature applications, unlike isocyanate-based adhesives. As such, the adhesive bonding between the body 34, particularly a body comprising a plastic or FRP, and the adhesive coating 26 may be improved where a polymer bonding group between the body 34 and adhesive coating 26 comprises at least one of natural rubber; butyl rubber; styrene-butadiene rubber (SBR); a chlorinated elastomer, such as polychoroprene and chlorinated polyethylene; polybutadiene; or synthetic polyisoprene. These bonding groups may be enabled by constituents of the adhesive coating 26 including an imide, a zinc-containing compound, and/or a selenium-containing compound.

To form the adhesive coating 26 on the electronic device 24, an adhesive, as described above, is applied to the electronic device 24. A coating process may include brushing, dipping, or spraying the adhesive coating 26 onto the electronic device 24. The adhesive may be diluted, for instance, to about 50% concentration, to facilitate coating at least the body 34 with the adhesive.

The thickness of the adhesive coating 26 may be one that is sufficient to facilitate the adhesion of the body 34 and, optionally, the antenna 36, to the first and the second elastomeric layers 20, 22. The adhesive coating 26 may be greater than about 10 µm, but is preferably between about 10 µm and about 50 µm. In one particular embodiment, the adhesive coating 26 is about 25 µm thick. One skilled in the art will appreciate that an adhesive coating 26 thinner than 10 µm may provide sufficient adhesion while adhesive coatings thicker than 50 µm may be more prone to breakage within the adhesive coating 26. The thickness of the coating may further depend upon the type of electronic device 24 secured within the assembly 10 including the configuration of the electronic device 24, the type of process used to apply the adhesive coating 26, and cost considerations incident to the manufacturing process. In addition, the adhesive coating 26 may be preceded by a primer coating (not shown) to enhance the bonding between the body 34 and the adhesive coating 26.

Following coating of the electronic device 24, the adhesive may be allowed to air dry before being stored in a manner to protect the coated electronic device 24 from contaminants. In one example, the coated electronic device 24 is stored in a plastic container until it is assembled with the elastomeric layers 20, 22. Once assembled, the assembly 10 may also be stored in a similar manner to protect the assembly 10 from moisture and air.

Once the assembly 10 is constructed as set forth above, the assembly 10 may be secured to the tire during the tire manufacturing process or post manufacturing of the tire, for example, during the retreading of the tire. To that end, the first and second elastomeric layers 20, 22 of the assembly 10 may comprise uncured, partially cured, substantially fully cured elastomeric materials, or a combination thereof depending upon when and where the assembly 10 is affixed to the tire.

With reference to FIGS. 2 and 3, in one embodiment, the assembly 10 may be incorporated internal to the tire casing during the tire building process. By way of example, the assembly 10 with the first and second elastomeric layers 20, 22 comprising two uncured natural rubber compound layers may be introduced into the tire casing during the tire build process. Subsequent vulcanization of the green tire secures the assembly 10 within the tire casing.

When one of the first and the second elastomeric layers 20, 22 comprises the butyl-containing compound, the assembly 10 may be secured to the innerliner of a green tire. The assembly 10 may be secured to the innerliner during building of the green tire such that during curing at least one of the first or the second elastomeric layers 20, 22 knits or bonds with the innerliner of a tire. For the reasons set forth above, when one of the first or the second elastomeric layers 20, 22 comprises a butyl-containing compound, the butyl-containing layer preferably forms the surface of the assembly 10 that is exposed to the environment within the tire during use thereof. In this case, it may be preferable that the butyl-containing layer has length and width dimensions that allow it to cover substantially all of the others layer secured to the innerliner of the tire. In embodiments comprising two uncured butyl-containing layer, the first and second butyl-containing layers 20, 22 may also knit to one another during the curing process of the tire. Thus, the assembly 10 remains secured to the tire without affecting the performance of the tire though the electronic device 24 is contained by the layers 20, 22 and may remain operational throughout the useable life of the tire.

Figure 4:
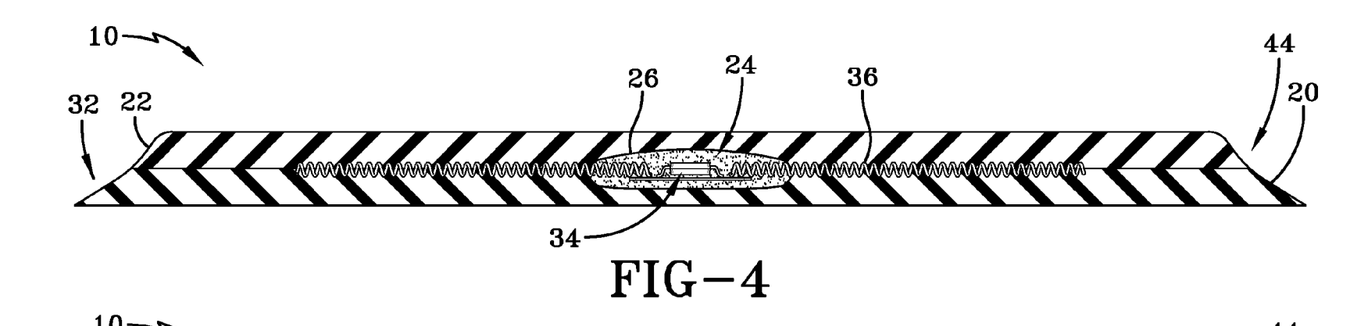
FIG. 4 is a cross-sectional view of the assembly of FIG. 2 taken along section line 4-4 illustrating an electronic device at least partially coated with an adhesive between elastomeric layers according to one embodiment of the invention.

In addition, as shown in FIG. 4, in one embodiment, first and second layers 20, 22 are configured with a reduced step-off 32 between the regions of the assembly 10 and the surface of the innerliner to facilitate securing the assembly 10 to the tire innerliner during the manufacturing of the tire. The difference in height between an outer surface near the edge of a device and the surface of the innerliner is often referred to as the "step-off." As is known in the art, a release agent may be used to prevent various forming/curing equipment components from sticking to the tire during the manufacturing process. The release agent interferes with the knitting of the assembly 10 with the tire as the release agent tends to accumulate around the edges of the assembly 10. By way of example, poor knitting or bonding between the assembly 10 and the tire may manifest itself in the form of cracking in the inner liner surface around the edge of the assembly 10. These cracks may be observed following stressing of the tire in an Outdoor Resiliometry (ODR) test or following other endurance tests. Reducing the step-off of the assembly 10 reduces the accumulation of the release agent around the edge of the assembly 10 and thus improves the knitting of the edge of the assembly 10 to the surface of the innerliner producing knotty tears or proper bonding.

Accordingly, and with reference to FIG. 4, in one embodiment of the invention one or both of the layers 20, 22 are configured to form a reduced step-off 32 as shown. As illustrated, the reduced step-off 32 may be in the configuration of a tapered edge 44, which has nearly a zero step-off, as shown, although other configurations are possible that reduce the thickness of the assembly 10 near the edge the assembly 10. The tapered edge 44 may extend substantially around the periphery of the assembly 10. As shown, a thickness of the first elastomeric layer 20 and the second elastomeric layer 22 taken through a center of the assembly 10 is greater than a thickness taken along a portion of a periphery of the assembly 10. While the tapered edge 44 is illustrated as a gradually sloping transition, other configurations may be sufficient to provide proper knitting along the edge of the assembly 10.

The reduced step-off 32, such as the tapered edge 44, may be formed by partially curing one or more of layers 20, 22 against a smooth bladder (not shown). Partially curing one or more of layers 20, 22 may include up to about a 90% cure. Depending upon the compound of the layers 20, 22, the pre-cure times and temperatures may range from 2 minutes at about 150° C. to 10 minutes at about 150° C., though the times and temperatures may vary to higher or lower temperatures for more or less time depending upon the materials and the desired percentage cure. The time and temperature may be selected such that the tapered edge 44 may be cured or set enough without reducing tackiness of one or both of the layers 20, 22. The degree of curing may be related to the shelf-life of the assembly 10 with an increasing degree of cure providing improved shelf life. It will be appreciated that partially curing the layers 20, 22 may prove to be advantageous in terms of sourcing and shipping the assembly 10 for use in markets around the world.

Figures 5, 6:
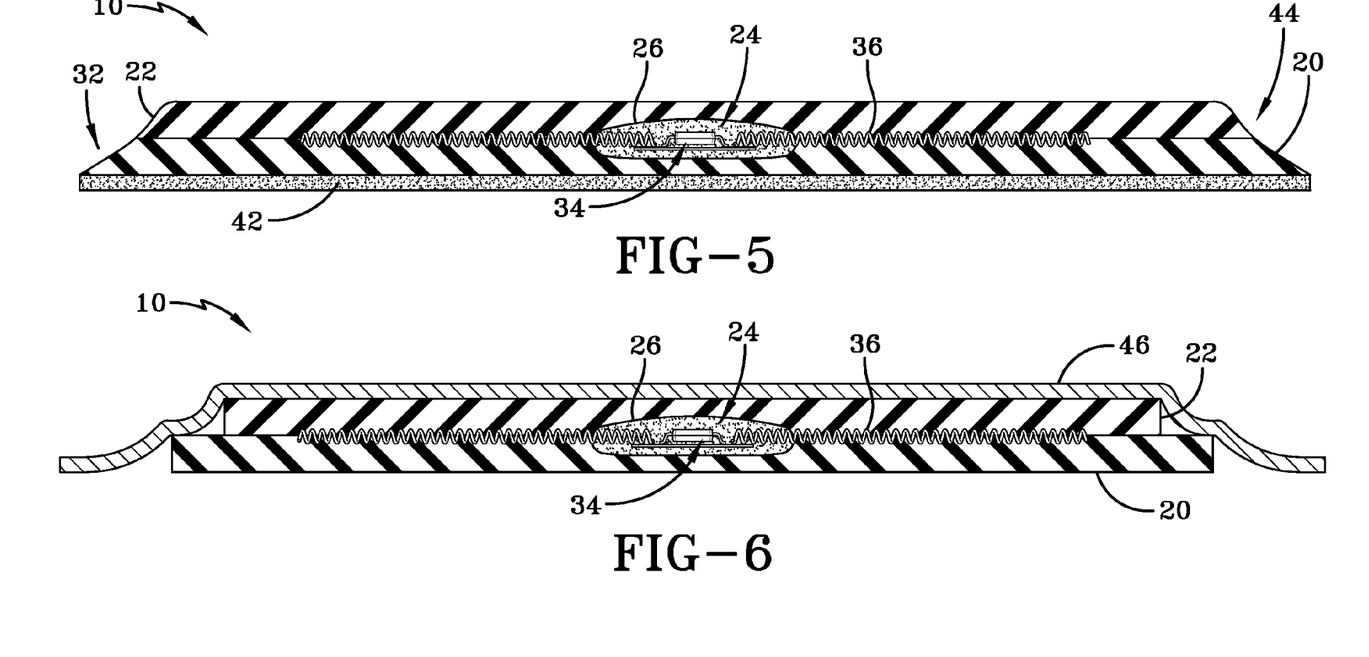
FIG. 5 is a cross-sectional view of the assembly of FIG. 2 taken along section line 4-4 illustrating an electronic device at least partially coated with an adhesive between elastomeric layers according to one embodiment of the invention.
FIG. 6 is a schematic representation of a cross-sectional view of another embodiment of the invention illustrating a polyester film.

While embodiments of the present invention may comprise two layers, i.e. the first and the second elastomeric layers 20, 22, in another embodiment, as is illustrated in FIG. 5, the assembly 10 further comprises a tie-gumstrip layer 42 secured to the first elastomeric layer 20. Additionally, as shown, embodiments of the invention with the tie-gumstrip layer 42 may also be configured with the reduced step-off 32, described above. The tie-gumstrip layer 42 facilitates the attachment of the assembly 10 to an innerliner of a tire subsequent to the manufacturing thereof. The tie-gumstrip layer 42 may be secured to the second elastomeric layer 22 without affecting the performance of the assembly 10. The tie-gumstrip layer 42 may comprise natural rubber compound, synthetic polyisoprene, polybutadiene, or butyl rubber. It will be appreciated that the tie-gumstrip layer 42 may also comprise fillers and rubber chemicals.

In embodiments of the invention with the tie-gumstrip layer 42, the first and second elastomeric layers 20, 22 are substantially fully cured. The tie-gumstrip layer 42, however, is uncured. The assembly 10 comprising substantially fully cured layers 20, 22 and the tie-gumstrip layer 42 may be secured to the innerliner of the tire following its manufacture with a cement. As is known in the art, the cement allows the tie-gumstrip layer 42 to undergo a room temperature cure or bonding with an innerliner surface. The tie-gumstrip layer 42 may be commercially available from Tech International, Johnstown, Ohio, or Patch Rubber Company, Roanoke Rapids, N.C. One particular application includes attachment to the innerliner during retreading of the tire casing or in another post manufacturing operation, such as repairing a flat tire. In this case, the assembly 10 may replace an existing, but non-functional, prior art device or may be a new addition to the tire. By way of example, the first or the second or both of the elastomeric layers 20, 22 may comprise the butyl-containing compound as described above.

In an alternative embodiment, shown in FIG. 6, the assembly 10 includes a film 46. By way of example only, the film 46 may be a MYLAR® polyester film from E. I. DU PONT DE NEMOURS AND COMPANY CORPORATION of Delaware. Alternatively, the film 46 may be made of nylon or another heat resistant film. The film 46 may sufficiently shield the step-off from accumulation of the release agent such that the assembly may be secured during the manufacturing of the tire. As shown in FIG. 6, the film 46 extends beyond the peripheries of both the first elastomeric layer 20 and the second elastomeric layer 22. In this case, the first and second elastomeric layers 20, 22 may be substantially the same length such that there may be little, if any, step-off between the first elastomeric layer 20 and the second elastomeric layer 22. This may be the case where, for example, the layers 20, 22 are assembled and then cut into individual assemblies. Accordingly, when the assembly 10 shown in FIG. 6, including the film 46, is placed onto the surface of an innerliner prior to curing, the film 46 shields the step-off from any significant accumulation of the release agent either from spray of the release agent or transfer from the forming/curing components utilized in the tire manufacturing process. While FIG. 6 depicts the second elastomeric layer 22 as being shorter than the first elastomeric layer 20, the first and second elastomeric layers 20, 22 may be substantially the same dimensions, in effect, creating one large step-off. However, the film 46 covers the step-off and thus substantially prevents the release agent from accumulating in this area. It is preferable that the film 46 extend approximately ½ inch beyond the edge of assembly 10 at locations where it is desired to have knitting between the innerliner and the first elastomeric layer 20, however, the film 46 may extend to lesser or greater distances depending upon the thickness of the assembly 10 and the film 46.

In order to facilitate a more complete understanding of the invention, the following non-limiting example is provided.

Example

Eight assemblies of one embodiment of the invention where constructed of two layers of natural rubber compound. Each layer measured about 6 inches by about 1 inch by about 0.050 inches thick. CHEMLOK® 6254 adhesive available from Lord Chemical was sprayed on to an RFID tag. The adhesive coating measured about 25 μm thick upon spraying and was allowed to air dry. The RFID tag had a body made of a fiber reinforced plastic (FRP). The coated tag was placed onto a layer of natural rubber compound. A plastic layer was placed onto the layer of natural rubber compound. The plastic layer had a rectangular area removed from its center such that the adhesive coated RFID tag was not covered by the plastic layer. A second layer of natural rubber compound was positioned on the plastic layer and exposed adhesive coated RFID tag. The plastic layer is not a normal component of the assembly but was added merely to facilitate subsequent testing by preventing bonding of the two layers of natural rubber compound while allowing bonding between the layers of natural rubber compound and the adhesive coated RFID tag. The individual assemblies were cured at 170° C. for 25 minutes.

Once cured, each of the assemblies was subject to lab adhesion pull testing with an INSTRON® tensile testing machine available from Illinois Tool Works Ins. Glenview, Ill. Accordingly, each layer of rubber was gripped by the INSTRON® tensile testing machine at one end. A standard pull test was performed at 180° at a rate of 2 cm/min followed by microscopic investigation of the interfaces around the RFID tag.

Figure 7:
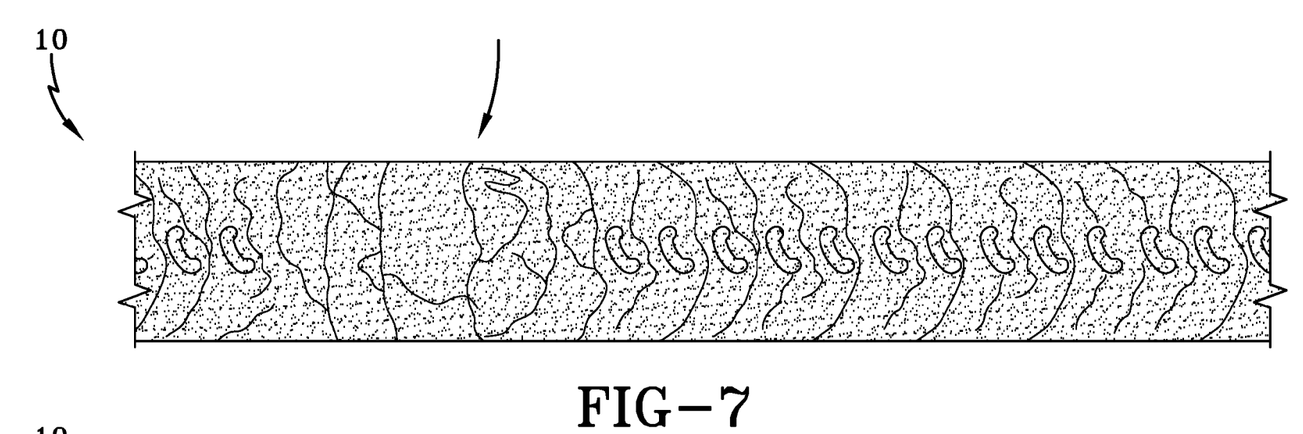
FIGS. 7 and 7A are a schematic reproduction of a cropped view of a photograph and the cropped view of the photograph, respectively, taken of one embodiment of the invention following a lab adhesion pull test.
Figure 7A:
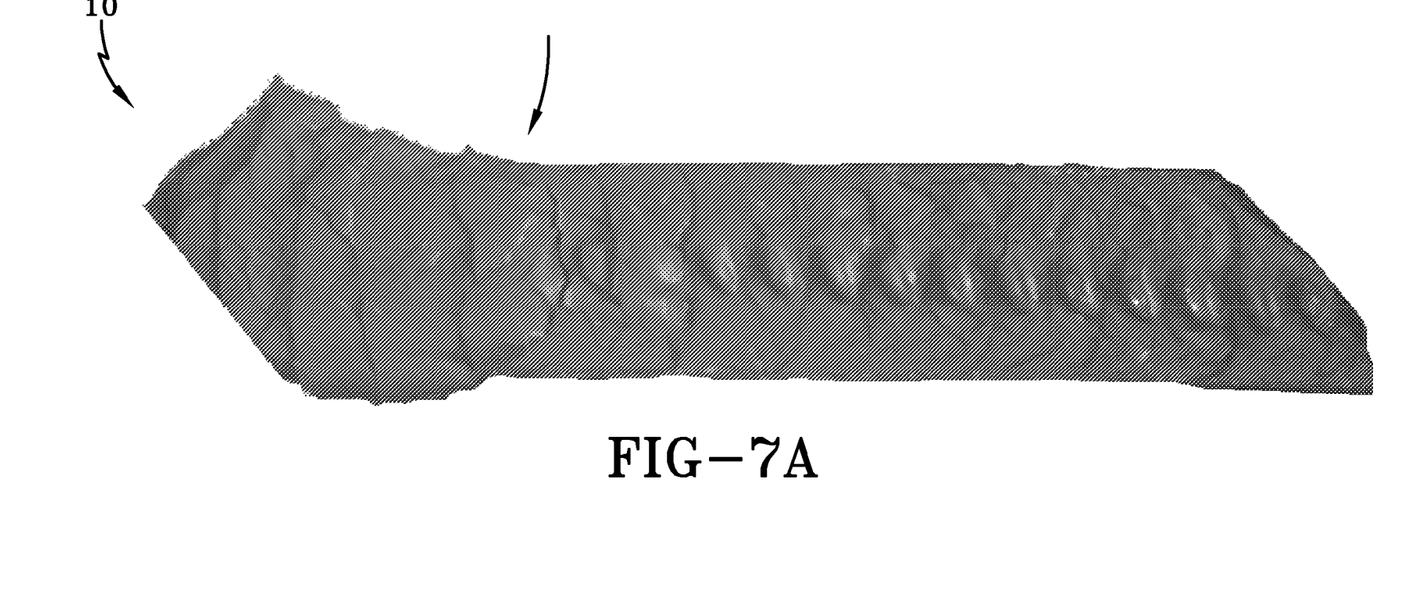

One exemplary assembly, following the pull test is shown in FIGS. 7 and 7A. Referring to FIGS. 7 and 7A, the pull test was conducted from the left to the right of the figures along the longitudinal axis of the assembly. As shown, the RFID tag remained covered by a portion of the rubber layer (the RFID tag is beneath the rubber layer as indicated by the arrow in FIGS. 7 and 7A). That is, no separation was observed between the adhesive coating and the FRP. Seven of the eight assemblies prepared according to one embodiment of the invention showed no separation at the interface between the FRP of the RFID tag and the rubber layer, i.e., in the adhesive coating.

Figure 8:
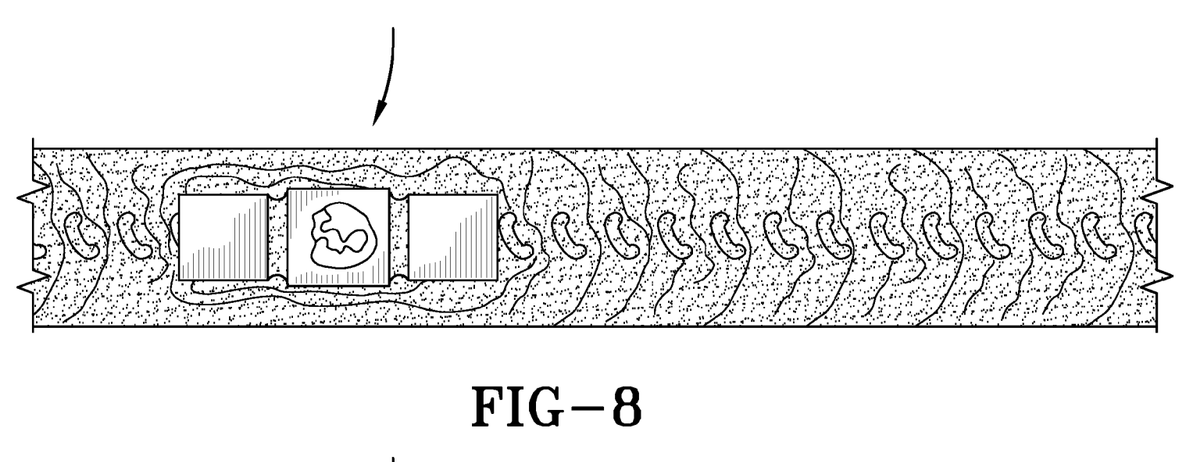
FIGS. 8 and 8A are a schematic reproduction of a cropped view of a photograph and the cropped view of the photograph, respectively, taken of a comparative device following a lab adhesion pull test.
Figure 8A:
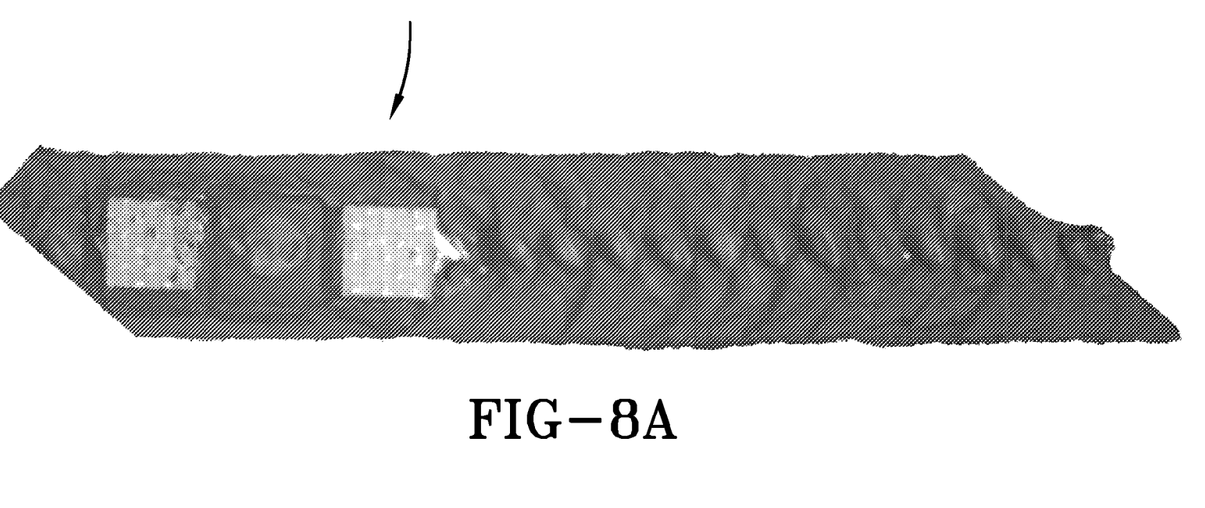

For comparison, eight additional test strips were constructed. Each of the comparative samples were formed by curing rubber layers together with the same model RFID tag as the previous test samples. However, rather than CHEMLOK®6254, CHEMLOK®250 adhesive was used to coat the RFID tags prior to placement between the two layers of rubber. According to the MSDS available from Lord Chemical, CHEMLOK®250 is an isocynate-based adhesive containing at least an aromatic polyisocyanate, a 4,4'-diphenylmethane diisocynate, and a diphenylmethane diisocyante. Following a curing process under substantially the same conditions as set forth above, the samples containing CHEMLOK®250 were subject to the same lab adhesion pull tests. A reproduction of a photograph of an exemplary sample constructed with CHEMLOK®250 and following lab adhesion pull testing is shown in FIGS. 8 and 8A. As shown, the RFID chip (indicated by the arrow) was exposed when subject to the same test procedure. The separation occurred between the CHEMLOCK®250 adhesive and the RFID tag indicating that the bond between the adhesive and the FRP that is weaker than in either of the adjacent rubber layers. Of the eight samples, six were characterized by separation between the adhesive and the FRP of the RFID tag similar to that shown in FIGS. 8 and 8A.

Advantageously, as set forth above, the assembly 10 may exhibit unexpected durability, including improved resistance to corrosion of portions of the electronic device 24, improved containment of the electronic device 24 between layers 20 and 22, and adherence to or within the tire 14 that has not been observed in the prior art. Thus, the assembly 10 may provide the durability required for long-term, "cradle-to-grave" applications including, for example, Radial Medium Truck (RMT) applications and Off-the-Road (OTR) applications. In other words, the assembly 10 may remain with the tire 14 during its useful life.

While the present invention has been illustrated by the description of one or more embodiments thereof, and while the embodiments have been described in considerable detail, they are not intended to restrict or in any way limit the scope of the appended claims to such detail. Additional advantage and modifications will readily appear to those skilled in the art. The invention in its broader aspects is therefore not limited to the specific details, representative methods and illustrative examples shown and described. Accordingly, departures may be made from such details without departing from the scope or spirit of applicant's general inventive concept.

What is claimed is:

1. An assembly for use on a tire having a tire wall, the assembly comprising:
a first elastomeric layer and a second elastomeric layer, wherein the first and second elastomeric layers comprise a butyl-containing compound or a natural rubber compound, and wherein the first and second elastomeric layers are configured with each elastomeric layer having a reduced step-off to define a tapered edge;
an electronic device having a body being at least partially made of a plastic material, wherein the electronic device is positioned between the first and second elastomeric layers;
an adhesive coating on the body of the electronic device that secures the body to the first and second elastomeric layers, the adhesive coating comprising an imide-based adhesive; and
a tie-gumstrip layer on the first elastomeric layer on a side opposite the second elastomeric layer for securing the assembly to an innerliner of the tire.

2. The assembly of claim 1 wherein the adhesive coating has a polymer bonding group comprising at least one of natural rubber, a chlorinated elastomer, butyl rubber, styrene-butadiene, polybutadiene, synthetic polyisoprene or a combination thereof.

3. The assembly of claim 1 wherein the adhesive coating is isocyanate free.

4. The assembly of claim 1 wherein the adhesive coating further comprises a zinc-containing compound.

5. The assembly of claim 1 wherein the adhesive coating further comprises a selenium-containing compound.

6. The assembly of claim 1 wherein a thickness of the first elastomeric layer and the second elastomeric layer taken through a center of the assembly is greater than a thickness taken along a portion of a periphery of the assembly.

7. The assembly of claim 1 wherein the first elastomeric layer and the second elastomeric layer are at least partially cured.

8. A tire comprising:
a tire wall; and
an assembly affixed to the tire wall, the assembly comprising:
  a first elastomeric layer and a second elastomeric layer, wherein the first and second elastomeric layers comprise a butyl-containing compound or a natural rubber compound, and wherein the first and second elastomeric layers are configured with each elastomeric layer having a reduced step-off to define a tapered edge;
  an electronic device having a body being at least partially made of a plastic material, wherein the electronic device is positioned between the first and second elastomeric layers; and
  an adhesive coating on the body of the electronic device that secures the body to the first and second elastomeric layers, the adhesive coating comprising an imide-based adhesive; and
  a tie-gumstrip layer on the first elastomeric layer on a side opposite the second elastomeric layer for securing the assembly to an innerliner of the tire.

9. The tire of claim 8 wherein the adhesive coating has a polymer bonding group comprising at least one of natural rubber, a chlorinated elastomer, butyl rubber, styrene-butadiene rubber, polybutadiene or synthetic polyisoprene or a combination thereof.

10. The tire of claim 8 wherein the adhesive coating is isocyanate free.

11. The tire of claim 8 wherein the adhesive coating further comprises:
at least one of a zinc-containing compound or a selenium-containing compound or a combination thereof.

12. The tire of claim 8 wherein the first elastomeric layer and the second elastomeric layer are at least partially cured.

13. The tire of claim 8 wherein a thickness of the first elastomeric layer and the second elastomeric layer taken through a center of the assembly is greater than a thickness taken along a portion of a periphery of the assembly.

14. A tire comprising:
a tire wall; and
an assembly affixed to the tire wall, the assembly comprising:
  a first elastomeric layer;
  a second elastomeric layer, wherein the first and the second elastomeric layers are selected from a group consisting of a butyl-containing compound and a natural rubber compound, wherein the first and second elastomeric layers are configured with each elastomeric layer having a reduced step-off to define a tapered edge;
  an RFID tag between the first elastomeric layer and the second elastomeric layer, the RFID tag having a body and an antenna, the body being at least partially made of a plastic material;
  an imide-based adhesive coating on at least the body of the RFID that secures the body to the first and the second elastomeric layers, the imide-based adhesive coating comprising at least one of a zinc-containing compound or a selenium-containing compound or combinations thereof and a polymer bonding group comprising at least one of natural rubber, a chlorinated elastomer, butyl rubber, styrene-butadiene, polybutadiene, or synthetic polyisoprene or a combination thereof; and
  a tie-gumstrip layer on the first elastomeric layer on a side opposite the second elastomeric layer for securing the assembly to an innerliner of the tire.

* * * * *

UNITED STATES PATENT AND TRADEMARK OFFICE
CERTIFICATE OF CORRECTION

PATENT NO. : 8,430,142 B2
APPLICATION NO. : 12/392677
DATED : April 30, 2013
INVENTOR(S) : Joseph Alan Incavo et al.

It is certified that error appears in the above-identified patent and that said Letters Patent is hereby corrected as shown below:

In the Claims:

Column 12

Line 26, CLAIM 14, after "RFID" insert --tag--.

Signed and Sealed this
Twenty-third Day of July, 2013

Teresa Stanek Rea
*Acting Director of the United States Patent and Trademark Office*